United States Patent [19]

Peters

[11] Patent Number: 5,839,488
[45] Date of Patent: Nov. 24, 1998

[54] HANDS-OFF LOW-AIR-LOSS QUICK-CONNECT QUICK-DISCONNECT FAST-FILL DUNNAGE BAG FILLING VALVE-NOZZLE ASSEMBLY & SYSTEM

[76] Inventor: Gerald L. Peters, 1201 Sand Bar Ferry Rd., Beech Island, S.C. 29841

[21] Appl. No.: 865,108

[22] Filed: May 29, 1997

[51] Int. Cl.⁶ .................................................. F16K 15/20
[52] U.S. Cl. .................... 141/347; 141/313; 141/346; 141/349; 141/382; 141/386; 137/223; 137/224; 137/231; 410/119
[58] Field of Search ............................ 141/10, 313, 317, 141/346–350, 382, 383, 386; 137/223, 224, 225, 231; 410/119, 125

[56] References Cited

U.S. PATENT DOCUMENTS

| | | | |
|---|---|---|---|
| 2,701,579 | 2/1955 | Hasselquist | 137/223 |
| 2,939,478 | 6/1960 | Dockrell | 137/223 |
| 3,087,518 | 4/1963 | Scholle | 141/317 |
| 3,242,951 | 3/1966 | Curie et al. | 141/350 |
| 4,102,364 | 7/1978 | Leslie et al. | 141/10 |
| 4,146,070 | 3/1979 | Angarola et al. | 141/68 |
| 4,265,280 | 5/1981 | Ammann et al. | 141/98 |
| 4,520,303 | 5/1985 | Inada | 141/10 |
| 4,993,462 | 2/1991 | Oxley et al. | 141/346 |
| 5,042,541 | 8/1991 | Krier et al. | 141/313 |
| 5,082,244 | 1/1992 | Krier et al. | 251/149.6 |
| 5,090,076 | 2/1992 | Guldager | 137/223 |
| 5,111,838 | 5/1992 | Langston | 137/223 |
| 5,348,059 | 9/1994 | Carroll | 141/349 |
| 5,367,726 | 11/1994 | Chaffee | 137/223 |
| 5,437,301 | 8/1995 | Ramsey | 137/231 |
| 5,765,612 | 6/1998 | Morin | 141/383 |

*Primary Examiner*—J. Casimer Jacyna
*Attorney, Agent, or Firm*—Laurence R. Brown

[57] ABSTRACT

Problems of filling dunnage bags for cushioning loads in transit in trailers, railroad cars, and the like, with air are resolved by this improved air filling bag valve and nozzle. In several respects the valves are superior in operation, wasting less air and filling time, and are less tiring for operators to use. For example, this nozzle simply slides laterally into place on the dunnage bag valve stem and locks itself there for hands off filling without manual pressure to press the nozzle axially against dunnage bag valve stems to open them, which is fatiguing with arms outstretched in the crowded spaces available. Damage is reduced that may result to dunnage bags when the filling nozzles are removed against the pressure of adjacent filled dunning bags and are withdrawn. These nozzles are simply pulled out laterally by the attached hose. The novel valve operation provides for opening of the dunnage bag valve stem by means of air pressure rather than manual force heretofore required for moving the valve stem axially into open position and holding it there. The filling valve provides air for filling the dunnage bag at a suitable pressure for rapid filling without danger of bursting the bags. Also the valve is connected to fill the dunnage bag with substantially no loss of air thus making operating costs lower.

23 Claims, 2 Drawing Sheets

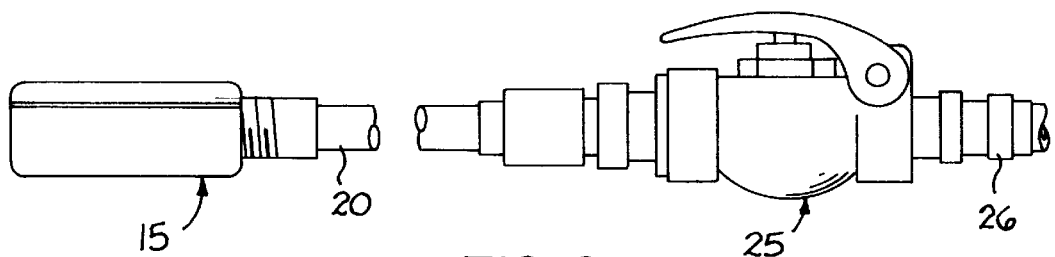
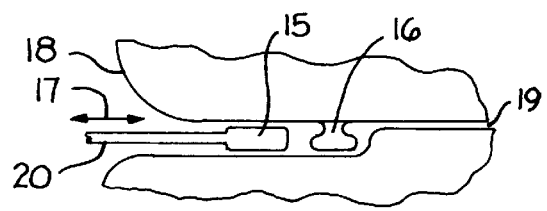
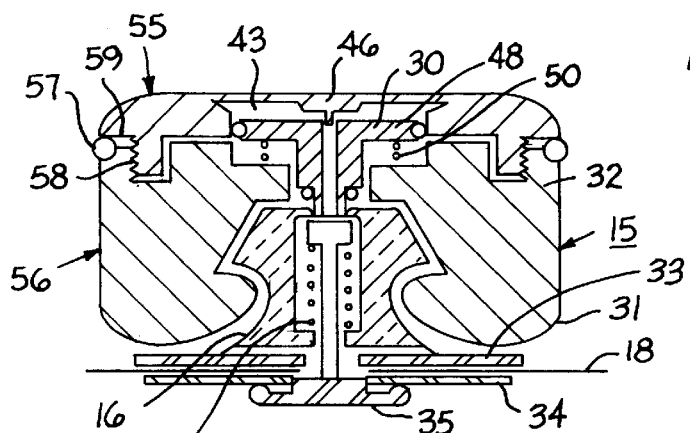
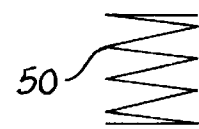
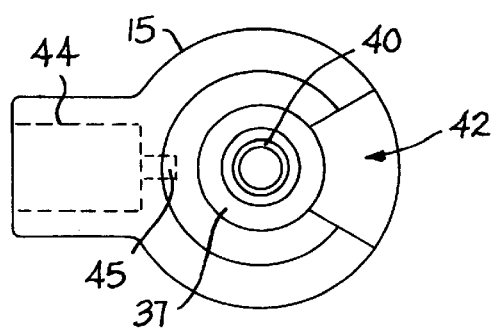
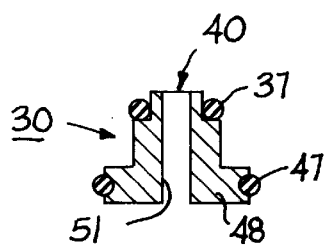

HANDS-OFF LOW-AIR-LOSS QUICK-CONNECT QUICK-DISCONNECT FAST-FILL DUNNAGE BAG FILLING VALVE-NOZZLE ASSEMBLY & SYSTEM

TECHNICAL FIELD

This invention relates to the dunnage bag inflation arts and more specifically it relates to an improved bag filling valve-nozzle assembly and corresponding bag filling system.

BACKGROUND ART

The dunnage bag method of packing cargo is well developed and widely used. In this art, it is conventional to have dunnage bags provided with protruding valve stem housings with axially movable valve mechanisms spring biased to hold the valve in a normally closed position for retaining air in the bags. Such valves are moved to an opened position for inflating the bag by a corresponding manually operated filling valve-nozzle assembly. A typical dunnage bag is shown in U.S. Pat. No. 3,808,981 issued to Russell E. Shaw on May 7, 1974 for DISPOSABLE INFLATABLE DUNNAGE.

Conventionally these dunnage bag valves are contained within stem bodies defining surrounding ridges or grooves for mating with a filling valve-nozzle assembly in the manner shown for example in U.S. Pat. No. 5,082,244 issued to Martin, Krier, et al. on Jan. 21, 1992 for CARGO AIR BAG INFLATION VALVE AND INFLATOR COMBINATION. In this example, a quick connect fitting is provided with a ball detent mechanism that snaps into place by manual axial movement down over the ridged stem body for opening the bag valve for filling with compressed air under pressure. The inflator valve is removed in similar manner by forceful manual axial movement of the nozzle-valve assembly off of the protruding stem body of the dunnage bag. An internal inflator nozzle-valve member physically engages the bag spring biased inflation valve member to open it for filling the dunnage bag with air while the nozzle-valve assembly is held in detented position.

This type of valve provides several previously unanswered problems in operation. One is the loss of air from both the compressor and the dunnage bag caused by connecting the valves holding the dunnage bag valve open for a finte time before the filling is started and after the filling before the detent mechanism is removed. Use of this system introduces further problems because of the nature of use of dunnage bags, which may be placed between cargo objects in places hard to reach and which may bury the inflation valve in the cargo or indented in an adjacent dunnage bag in which the valve assembly is urged when the bags are inflated. Thus, a quick disconnect with little loss of air is unlikely in actual use, is manually fatiguing and may cause damage to the cargo or dunnage bags.

This also leads to a manual quick-disconnect problem where space becomes more limited as the bags are filled and the axial movement of the valves to disconnect may require significant manual inconvenience or fatigue by the necessity to reach in and axially force the detented filling valve off from the protruding dunnage bag stem housing.

Still further problems involve the man-hours of time it takes to fill a cargo load of dunnage bags when additional time has to be taken to disconnect or connect the valves, to make sure that the detents are properly axially seated and to attain the proper dunnage bag pressure in the presence of leakage.

Similar problems are introduced by the bayonet type push-on-and-twist-to-lock DUNNAGE BAG AIR VALVE AND COUPLING U.S. Pat. No. 5,111,838 issued May 12, 1992 to Lonnie W. Langston. At the expense of a complex manually operated mechanism Martin Krier, et al. in U.S. Pat. No. 5,042,541 issued Aug. 27, 1991 to Martin Krier, et al. entitled INFLATION NOZZLE FOR CARGO AIR BAG, the dunnage bag valve is optionally released and closed by a manually actuated lever extending down the air hose line from the filling valve, but there are no solutions for the other problems hereinbefore proposed.

These problems are further supplemented by the requirement with some valves for manually holding the inflation nozzle forcefully in place to open the dunnage bag valve during the entire filling period and inefficient coupling to the pressurized air source that reduces filling pressure and takes longer to fill the dunnage bags, as particularly evident in the DUNNAGE BAG INFLATION AIR GUN of U.S. Pat. No. 4,146,070 issued to Barry R. Antarola, et al. on Mar. 27, 1979.

Accordingly it is applicant's objective to provide an improved dunnage bag filling valve-nozzle assembly and system which solves the aforesaid problems of the prior art.

DISCLOSURE OF THE INVENTION

This invention therefore provides a quick connect and quick disconnect bag filling valve fitting for mating with a dunnage bag inflation valve stem housing operable to laterally move on and off the dunnage bag inflation valve housing. The filling valve housing furthermore locks onto the dunnage bag inflation valve housing to prohibit axial movement without manually holding the valve in place by way of mating tongue and groove structure about the substantially cylindrically shaped housing structure of both valves. The lateral connection mode is achieved by a converging entryway into the filling valve housing that rides over the inflation valve stem housing to mate the tongue and groove structure and align the two valves in a seated position ready for the filling step with the valve stem of the dunnage bag valve in alignment with the air filling path of the bag filling valve. Thus the two valves are locked axially together without requiring manual force.

Another feature of the invention is the pneumatic movement of the dunnage bag valve stem with the two valves in axial alignment. A diaphragm operated plunger in the bag filling valve, in response to the opening of an air line valve to let in compressed air, is moved typically an eighth of an inch into a locked-in and sealed position with the dunnage valve stem body thereby holding the dunnage valve open for filling and unlocking the valves for removal of the filling valve by lateral movement when the compressed air source is removed. The valve structure is fashioned so that the typically 60 psi air pressure for holding the dunnage bag open against its spring bias and the further spring bias of a return spring in the filling valve is reduced in pressure through an alternate path for filling the dunnage bag with the desired pressure, usually about four psi. When the air line valve is closed to remove the compressed air source, the filling valve plunger is returned to its original condition by means of the return spring which was previously overcome by the original impact of the compressed air when the air line valve was first opened.

The filling valve is now no longer locked in mating registration and is ready to be removed laterally, since the plunger that holds the dunnage bag valve open is returned to laterally unlock the mated axially aligned valves. The filling valve housing is preferably a cylindrical disc fitted to the end of an air line which can be quickly put into place and removed by lateral movement with little manual effort and without damage to the dunnage bags even when the bag presses the valve stem against cargo or adjacent bags in crowded locations.

The filling valve structure substantially prevents loss of air usually expected in conventional valves when a manually forced depression or release of the dunnage valve stem is required to attach or remove the compressed air line, and thus saves considerable operating cost.

Furthermore the time taken to connect the valves and inflate the dunnage bags is significantly reduced, as well as manual exertion, so that significant labor expense and expedited cargo loading times are achieved.

Other objects features and advantages of the invention will be found throughout the following drawings, description and claims.

BRIEF DESCRIPTION OF THE DRAWINGS

In the accompanying drawings, wherein like reference characters throughout the various views designate similar features and wherein the drawings are not necessarily to scale in order to better understand the operation and interaction of the various parts:

FIG. 1 is a side view sketch illustrating the lateral movement of the filling valve of this invention into mating engagement with a dunnage bag valve;

FIG. 2 is a side view sketch of the filling valve of this invention coupled to an air compressor source by an air line with an on-off in-line valve for use in filling dunnage bags;

FIG. 3 is a side view sketch, partly cut away to show internal valve parts, looking into a forward end of the valve (at the right in FIG. 1);

FIG. 4 is a side view of a plunger return spring;

FIG. 5 is a side view in section of the movable valve plunger;

FIG. 6 is a top view of the valve looking into the converging entryway for receiving a dunnage valve stem;

THE PREFERRED EMBODIMENT

Figure 8:
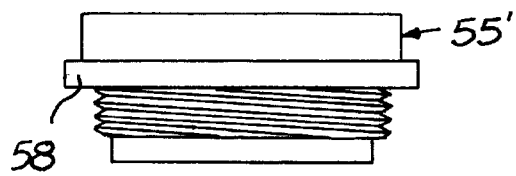
FIGS. 7, 8 and 9 are respectively a view looking into a valve body member, an insert plug side view and the insert plug end view looking into the FIG. 7 view, of an alternative embodiment of the invention.

It is seen from FIG. 1 that the filling valve 15 afforded by this invention is moved laterally in and out of mating engagement with the lipped or tongued dunnage bag valve stem housing 16 as designated by arrow 17. Thus, the valve is advantageous in crowded cargo spaces where access to the dunnage valves stem housings 16 makes it difficult to use conventional valves that are manually forced in place in axial alignment with a dunnage valve stem and in some instances must be twisted, locked or held down in place. This filling valve 15 is particularly advantageous in removal when dunnage bags 18, 19 for example are filled and placed close to cargo or other dunnage bags. The lateral movement feature permits the filling valve 15 to be simply removed without damage to the dunnage bags by a gentle tug on the air line hose 20. The filling valve may even be inserted for increasing the pressure in an inflated dunnage bag having a "hidden" valve stem housing with little danger of damaging the bags. This lateral engagement mating feature saves considerable time not only in the filling operation, but in the organization of the dunnage bags in the cargo area, because location of the dunnage valve stem housings becomes much less critical.

As seen in FIG. 2, the filling valve 15 is coupled by air line 20 to a manually actuatable off-on compressed air valve 25, which is in turn coupled to a compressor or other compressed air source by air line 26. The preferred disc-type contour of the filling valve 25 may be rounded and particularly dimensioned for ease of withdrawal and use in the dunnage bag/cargo environment in which it is used. This configuration, as hereinafter shown, may be thin, in the order of one inch thick to mate laterally with the protruding dunnage bag valve stem housing 16. Its thickness is typically one and a half inch or less.

The cut-away, not to scale, sketch of FIG. 3, illustrates the general structure and operating mode of the dunnage bag fling valve 15 when in mating engagement with the protruding valve stem housing 16 of dunnage bag 18. FIGS. 4 and 5 show the journalled movable plunger 30 and its biassing spring. This is the preferred mode of operation over a diaphragm, which could replace the plunger but would not be as sturdy in the presence of high air pressures or workable over as long a life span. FIG. 6 is a view looking into the open mouth on the nozzle side of filling valve nozzle 15. This embodiment represents the preferred disc-like shape of the nozzle with rounded comers 31. This valve can be made slightly thicker than the height of the dunnage bag stem housing 16, typically less than one inch thick. The valve body 32 is shown sectioned for metal but could be a hard plastic material.

The stem housing 16, sectioned for its typical hard plastic construction, is affixed to the dunnage bag 18 typically by two rubberlike gaskets 33, 34, and contains a valve stem with a rubberlike plastic valve head 35 that opens for filling the dunnage bag and is sealed shut to retain air by the spring 36 in normal rest position The upper mouth of the stem housing 16 is tapered inwardly to receive the sealing gasket O-ring 37 about the plunger 30 of the filling valve 15 of this invention. The plunger 30 is substantially instantaneously sealed when the valve 25 to the air line is opened and the dunnage bag 18 is thus filled with air without leakage or waste of air. The cylindrical plunger end 40 is registered to mate within the stem housing open mouth and pushes the stem plunger downwardly against the pressure of spring 36 to open the dunnage bag inflation valve in the presence of compressed air of appropriate magnitude for operating the valve, typically 60 psi.

As seen looking into the nozzle mouth of the filling valve 15 in FIG. 6, the plunger end 40 is axially aligned with the dunnage valve stem body open mouth as the filling valve laterally slides over the lipped stem housing 16 into registration as shown in FIG. 3, where the valve is locked in place against axial movement by the mating tongue and groove structure on the two valve housings. The entry mouth 42 of the filling valve for receiving the dunnage bag stem housing 16 is thus substantially triangular to converge inwardly for simple and rapid guided engagement of this valve into registration. This entry mouth 42 is thus indented into the filling valve body 15 approximately one-half inch from the valve surface.

As seen in FIG. 6, the air inlet port 44 is internally threaded into the body filling valve 15, at the rear of the FIG. 3 sketch, and has a passageway 45 which passes compressed air into the operating chamber 43 of FIG. 3 for the purpose of moving the plunger 30 downwardly off the seat 46 to start to move the end 40 into the dunnage valve stem body mouth as illustrated. The larger diameter diaphragm 48 of the plunger carries the O-ring sealing member 47 for journalling on a cylindrical mating surface. Thus initially, as the air source is connected by valve 25 (FIG. 1) the full pressure of the compressed air source is available at 45 and at 43 to move the plunger 30 downwardly against the pressure of its own return spring 50 and the spring 36 of the dunnage valve stem 16.

The inner cylindrical bore 51 of the plunger 30 fits snugly over the cylindrical peg of the plunger seat 46 so that very little air can be lost before the dunnage bag valve is opened to let air flow into the dunnage bag. However, when plunger 30 moves downwardly enough to leave the peg, air can pass down the inner bore 51 of the plunger 15 and pass through the opened dunnage bag valve 35 to fill the dunnage bag. A typical stroke required to open the dunnage bag valve is about one-eighth inch. Thus the peg of the plunger seat 46 serves during that stroke as a diversion valve to change the flow path of air through the filling bag after the plunger snaps the valve into locked and sealed axial mating position with the dunnage bag inflation valve. By the ratio of diameters of the inner bore 51 and the filling valve diaphragm 48, the air pressure of the incoming air flowing through the plunger into the dunnage bag is decreased to a level for quickly filling the bags to about four psi without danger of bursting the bags with excessive air pressure.

When the compressed air supply is shut off at valve 25 (FIG. 1), the plunger return spring 50 instantaneously returns the plunger back upon the valve seat 46 and lets the dunnage valve close by pressure of its spring 30, all with very little loss of air in the disconnect process. Thus, this dunnage bag filling valve and nozzle structure and system is efficient in operation and reduces losses of compressed air encountered in the filling of dunnage bags of the prior art. The filling valve 15 is then retrieved from its mated position about the dunnage bag valve housing 16, shown in FIG. 3 by a tug on the air line 20 (FIG. 1). This reduces the operation time in filling a bag, where the operator is in the prior art required to reach into the mating site, manually disengage the filling bag valve and remove it. Except for the manual insertion of the valve laterally upon the protruding dunnage bag valve stem body, operating the compressed air source valve and removal of the valve laterally by a tug on the line, the valve completely automatically performs the remaining functions of aligning the valves axially, connecting the valves in an air tight seal, pushing down the dunnage valve stem and holding it down while loading air. Thus, operators are significantly relieved from fatigue. A typical filling cycle for a dunnage bag with this valve is about twenty seconds, compared with about four minutes when using prior art valves.

The valve body is more easily machined if made in two parts, screwed together. Thus, the cover member 55 and the base member 56, screwed together in this embodiment at the mating threads 58 on the respective members 55, 56. The O-ring seal 58 of rubber-like material is inserted between the two members to confront the O-ring seating abutment 59 at the outer edge thereby to prevent escape of compressed air through the threaded together parts.

Figure 7:
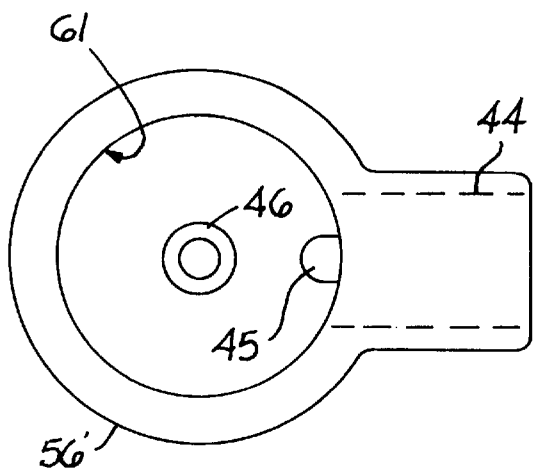
Figure 9:
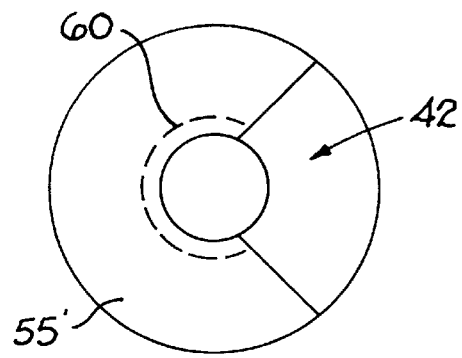

FIGS. 7–9 show a similar assemblage of the two members 55', 56' in which the cover or closure member 56' has the nozzle containing base member 55' extending therefrom as a superstructure when assembled. In this embodiment, the closure member 56' is thick enough to contain the air inlet fitting 44 and the nozzle containing base member 55' is thick enough to contain the entryway slot 42 for laterally encompassing a mating dunnage bag stem housing, and locking it axially in place by means of an internal groove 60 matching a corresponding tongue of the stem housing.

The threads 58' are shown on the FIG. 8 side view of the base member 55', and the O-ring 58 abuts an upper shoulder at the top of the threads 58' for seating upon the rim of the closure member 56' at the edge of the circumferential bore which contains the mating threads for screwing the base member 55' into the closure member 56'.

Figure 10:
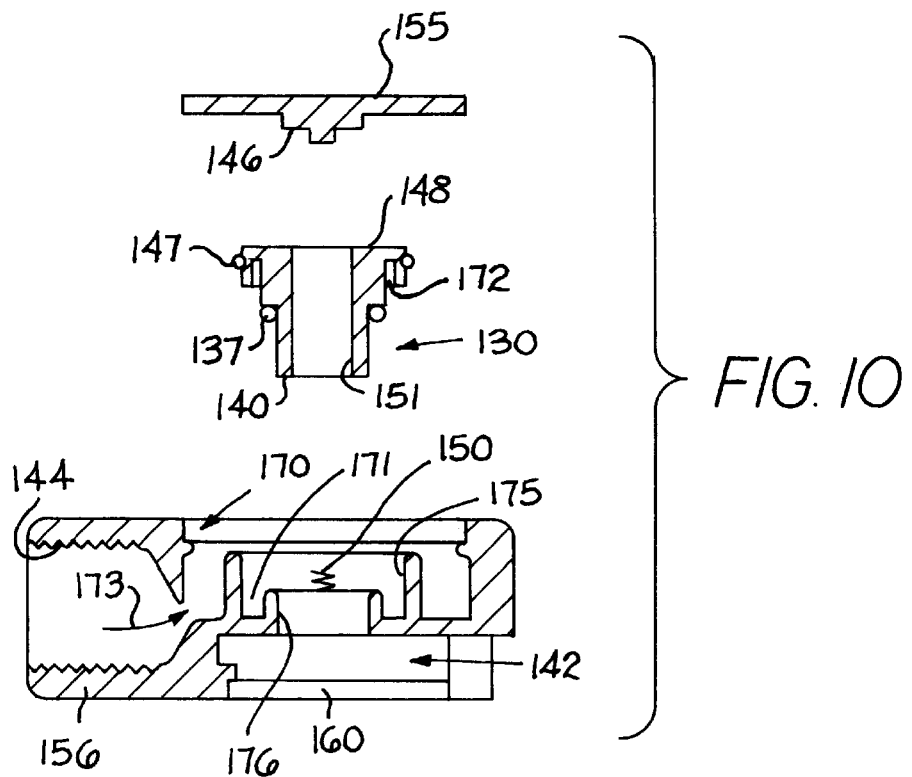
FIG. 10 is an exploded view, in section of a further embodiment of the invention.

As seen from the exploded view of FIG. 10, the nozzle assembly has the three basic parts, namely lid 155, body 156 and plunger 130. The lid 155 is secured to the body 156 by an air tight seal into notch 170 by welding, use of external screws, or the like, using an O-ring sealing gasket, if desired. The springs 150, typically three concentrically spread about the notch 171 mate into plunger notch 172 to provide the plunger bias toward the return position against lid 155 with the peg base 146 entering the plunger hollow center 151.

Compressed air 173 from the connected fitting threads 144 then engages the larger diameter diaphragm 148 of plunger 130 to counteract the plunger spring bias, letting the plunger with O-ring 147 move on surface 175 to open the dunnage bag valve with plunger end 140, moving through the central cylindrical opening 176 to engage a valve steam mated into the entryway 142.

As the plunger diaphragm 148 moves away from the lid 155, its seat against peg 146 is broken to let air flow being diverted into the opened dunnage bag valve at a lower filling pressure then required to open the dunnage valve bag, because of the changed dimensions of the air flow cavity thus achieved.

It is therefore seen that the dunnage bag filling nozzle valve assembly and system afforded by this invention has advanced the state of the art. Accordingly those features of novelty describing the nature and spirit of the invention are set forth with particularity in the following claims.

What is claimed is:

1. A quick connect dunnage bag filling valve system, comprising in combination:

an air filling valve fitting for mating with a dunnage bag inflation valve fitting protruding from a dunnage bag for actuating said inflation valve and inflating said dunnage bag, said inflation valve fitting having a housing stem coaxially surrounding an axially movable valve mechanism spring biased to retain air in the dunnage bag and corresponding interlocking housing stem structure adapted to receive and align the inflation valve fitting with a mating air filling valve assembly for overcoming spring bias of the axially movable valve mechanism and for introducing pressurized air into the dunnage bag, and a housing for the air filling valve assembly defining a nozzle and air inlet opening further having interlocking engagement structure adapting the air filling valve to move the nozzle laterally from a direction substantially normal to the axially movable valve mechanism of the inflation valve into aligned interfitting engagement with said inflation valve suitable for introducing air into the dunnage bag.

2. The bag filling valve system of claim 1 further comprising locking means on the air filling valve assembly for mating with the stem interlocking structure to hold the air filling nozzle in said aligned interfitting engagement without substantial movement of the air filling nozzle in the axial direction of the axially movable inflation valve mechanism.

3. The bag filling valve system of claim 2 wherein the locking means comprises mating tongue and groove structure on the respective filling valve housing and the inflation valve stem.

4. The bag filling valve system of claim 2 further comprising air filling valve structure in said housing for presenting air under pressure flowing from the air filling valve to move said axially movable inflation valve mechanism axially into a position for introducing air into the dunnage bag.

5. The bag filling valve system of claim 4 further comprising an internal movable plunger in said housing, and air flow structure providing an initial air flow path to this movable plunger at a high pressure for overcoming the inflation valve mechanism spring bias and diversion of the air flow path upon movement of the plunger to a lower pressure air flow path into the dunnage bag for filling.

6. The bag filling valve system of claim 5 further comprising a biasing spring retaining the movable plunger into a position blocking air flow through the bag filling nozzle below a predetermined threshold pressure of input air.

7. The bag filling valve system of claim 5 further comprising air flow sealing means in said bag filling valve system diverted by said movable plunger to substantially prevent flow of air through the filling valve nozzle before the inflation valve mechanism is fully opened to pass air into the bag.

8. The bag filling valve system of claim 1 wherein the housing valve engagement nozzle structure further comprises a substantially cylindrical cavity for partially surrounding the inflation valve stem thereby defining a converging entryway for guiding the inflation valve laterally into said aligned engagement with said substantially cylindrical cavity.

9. The bag filling valve system of claim 1 wherein said inflation valve stem defines a cylindrical engagement lip for sealing to a filling valve nozzle for receiving airflow into the dunnage bag, and mating cylindrical structure within said filling bag housing for substantially air tight sealing with the stem.

10. The bag filling valve system of claim 1 further comprising in the filling valve fitting an internal movable plunger movable to engage and overcome the inflation valve spring bias in response to air from a high pressure source flowing into said filling valve.

11. The bag filling valve system of claim 10 further comprising a bias spring in said filling valve retarding the movement of said internal movable plunger in the absence of a predetermined air pressure value at said inlet opening.

12. The bag filling valve system of claim 10 further comprising an air flow passageway in the interior of said filling valve housing for directing air from a high pressure source coupled to said inlet opening into an air flow path operable to first move the internal movable plunger toward a position to open the inflation valve for entry of air into a dunnage bag.

13. The bag filling valve system of claim 1 wherein the housing comprises in combination: a cylindrical cavity structure coupled to the air inlet opening and closed at one end from which an axial post extends internally toward the nozzle, an internal plunger defining a central bore riding snugly upon said axial post, said plunger further defining a diaphragm for resting upon the closed cavity end and sealed about its periphery to the cylindrical cavity by an O-ring, and said plunger having about the central bore a shouldered body with a reduced diameter nozzle opening, with an O-ring about the circumference of the reduced diameter portion aligned for engaging and sealing the stem of the inflation valve as the reduced diameter portion enters the inflation valve stem to open the movable valve mechanism for entry of air into the dunnage bag.

14. The bag filling valve system of claim 13 further comprising air passageway structure between the central bore of the internal plunger and the axial post of restricted cross section for filling the dunnage bag at a lower pressure than that required to open the inflation valve.

15. The bag filling valve system of claim 14 further comprising a closure body for said cylindrical cavity having a central nozzle bore and locking means for engaging mating structure on the inflation valve stem by lateral movement towards the axially movable inflation valve mechanism to lock the filling valve in said aligned engagement without substantial movement in the axial direction of the axially moveable inflation valve mechanism.

16. The bag filling valve system of claim 15 wherein the housing valve engagement structure further comprises a substantially cylindrical cavity for partially surrounding the inflation valve stem opening on a cylindrical sidewall to define a diverging entryway for guiding the filling valve into said aligned engagement in said substantially cylindrical cavity.

17. The air nozzle assembly of claim 1 further comprising a disc-like valve body shape of a thickness not exceeding one and one-half inch.

18. A quick connect dunnage bag filling valve system, comprising in combination:

a air filling valve fitting with a nozzle adapted to mate with an air bag inflation valve fitting protruding from a dunnage bag to actuate said inflation valve and to inflate said dunnage bag, said inflation valve fitting having a stem coaxially surrounding an axially movable valve mechanism spring biased to retain air in the dunnage bag and corresponding stem structure adapted to receive and align therewith a mating air filling valve assembly for introducing pressurized air into the dunnage bag, and internal air flow passageway structure in the air fling valve nozzle and corresponding means responsive to air pressure of a predetermined magnitude for opening the inflation valve spring biased mechanism to open an air passageway into said dunnage bag in response to the presence of said air pressure magnitude at said air filling valve.

19. The bag filling valve system of claim 18 further comprising a housing for the air filling valve fitting having valve engagement structure adapting the air filling valve to move laterally from a direction substantially normal to the axially movable valve mechanism of the inflation valve into aligned engagement with said inflation Valve for retained residence while introducing air into the dunnage bag.

20. The bag filling valve system of claim 18 wherein said corresponding means further comprises an air actuated movable plunger that enters the inflation valve stem to overcome the inflation valve movable valve mechanism spring bias and move it into an open position.

21. The air nozzle assembly of claim 18 further comprising a disc-like valve body shape of a thickness not exceeding one and one-half inch.

22. An air nozzle assembly for filling dunnage bags having stems containing an axially movable inflation valve spring biased to urge a dunnage bar inflation valve into closed position retaining air obtained from a pressurized air supply source in the bags, comprising in combination:

a nozzle for aligning with the inflation valve to provide air for a dunnage bag from said supply source, an air pressure actuated movable plunger within said nozzle operable in response to said pressurized air functioning as valve means to move the dunnage bag inflation valve into an open position for admitting air from the source into the dunnage bag and pressure reducing means for supplying dunnage bag air at air pressure lower than that supplied from the source to move said plunger.

23. A air nozzle assembly for filling dunnage bags having stems containing an axially movable inflation valve spring biased to urge the valves into closed position retaining air in the bags, comprising in combination: a nozzle for aligning with the inflation valve to provide air, an air pressure actuated plunger within said nozzle operable to move the dunnage bag inflation valves into open position for admitting air into the dunnage bag, and interlocking means on the air nozzle assembly and dunnage bag valves for aligning by lateral movement between the nozzle and valve the nozzle in place to deliver air to the dunnage bag through said inflation valve without axial movement of the aligned nozzle assembly.

* * * * *